No. 787,735. PATENTED APR. 18, 1905.
N. DU BRUL.
RADIAL CIGAR BUNCH MACHINE.
APPLICATION FILED NOV. 11, 1903.
5 SHEETS—SHEET 3.
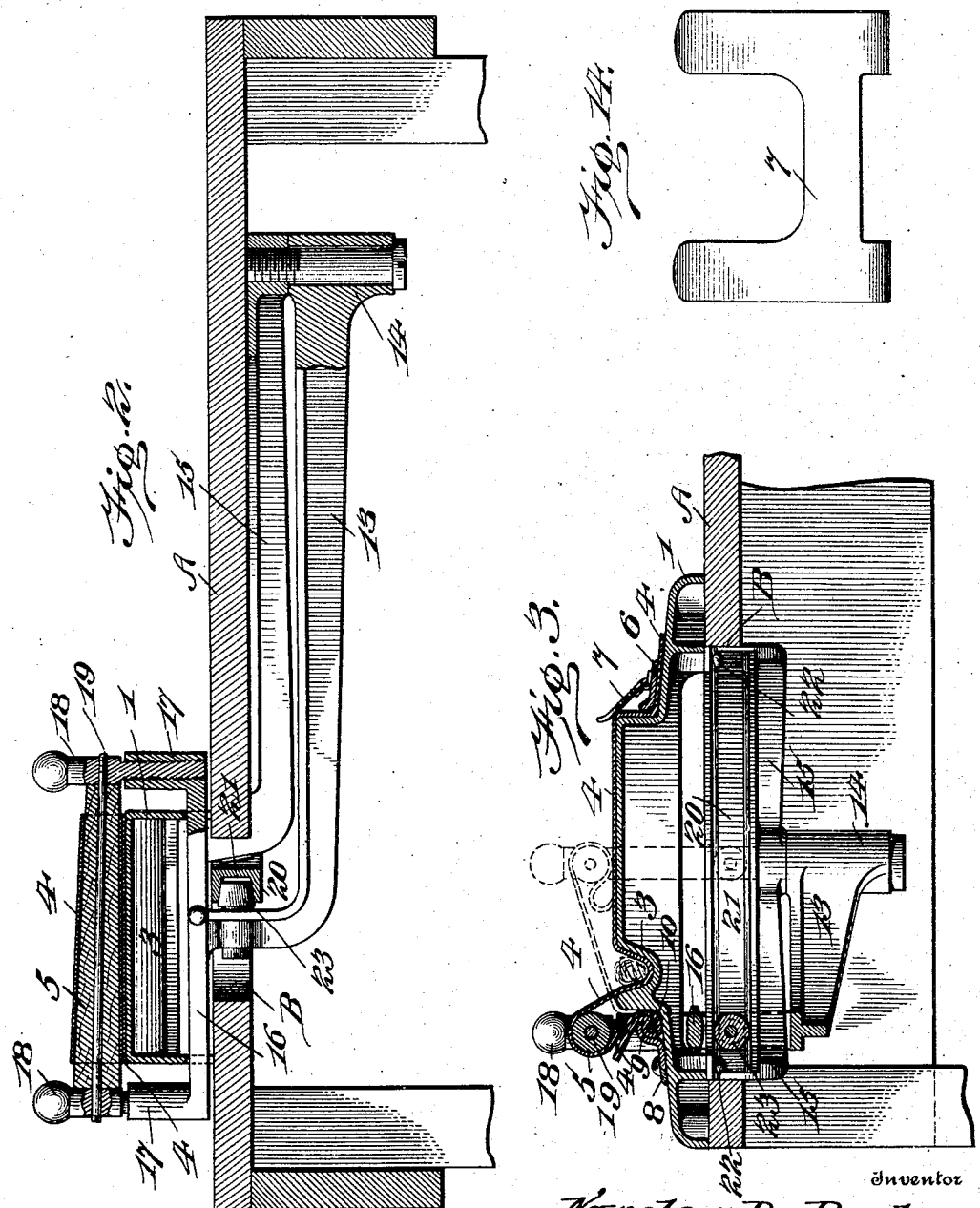
Witnesses
H. G. Dieterich
Inventor
Napoleon Du Brul
By Knight Bros
Attorneys

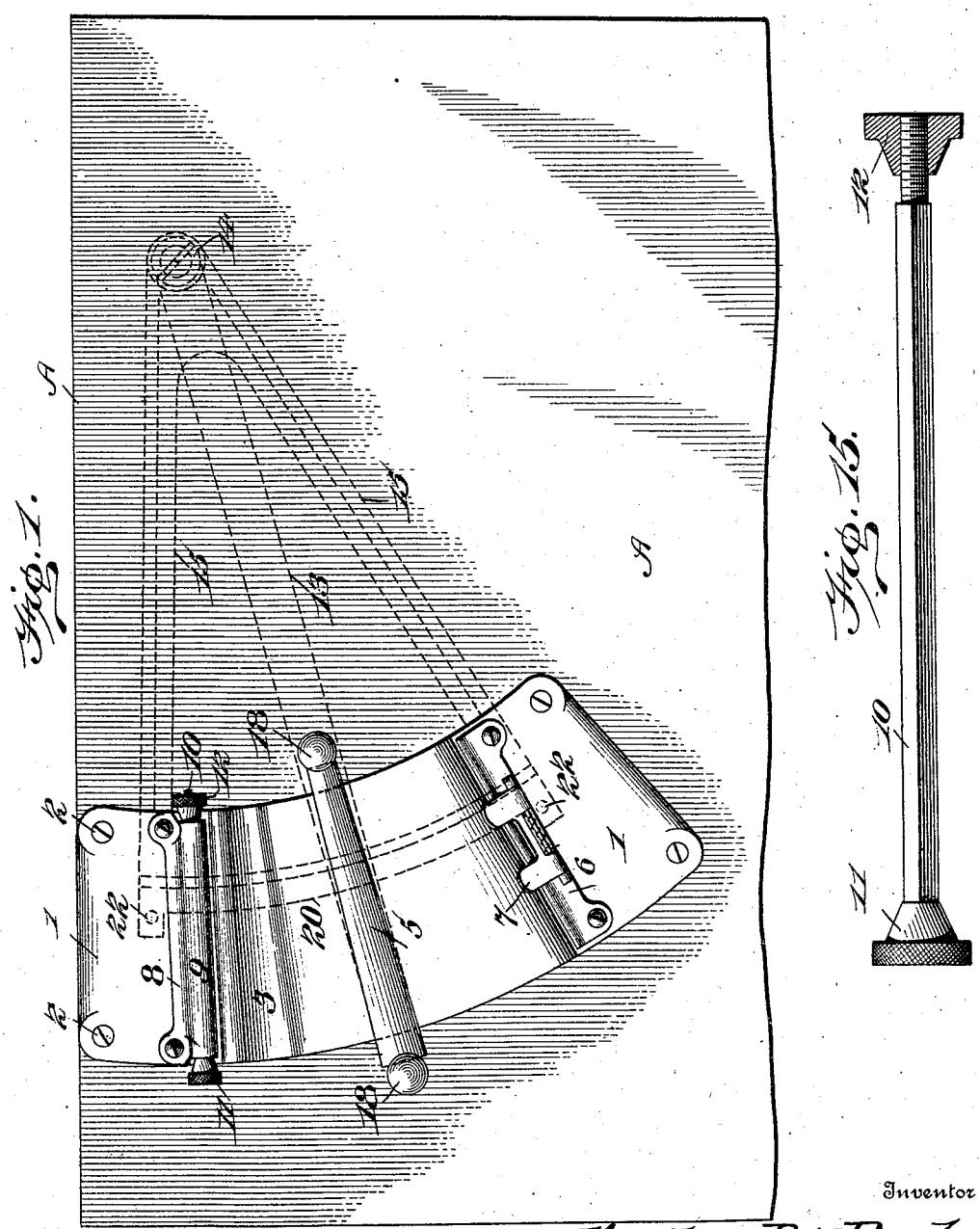

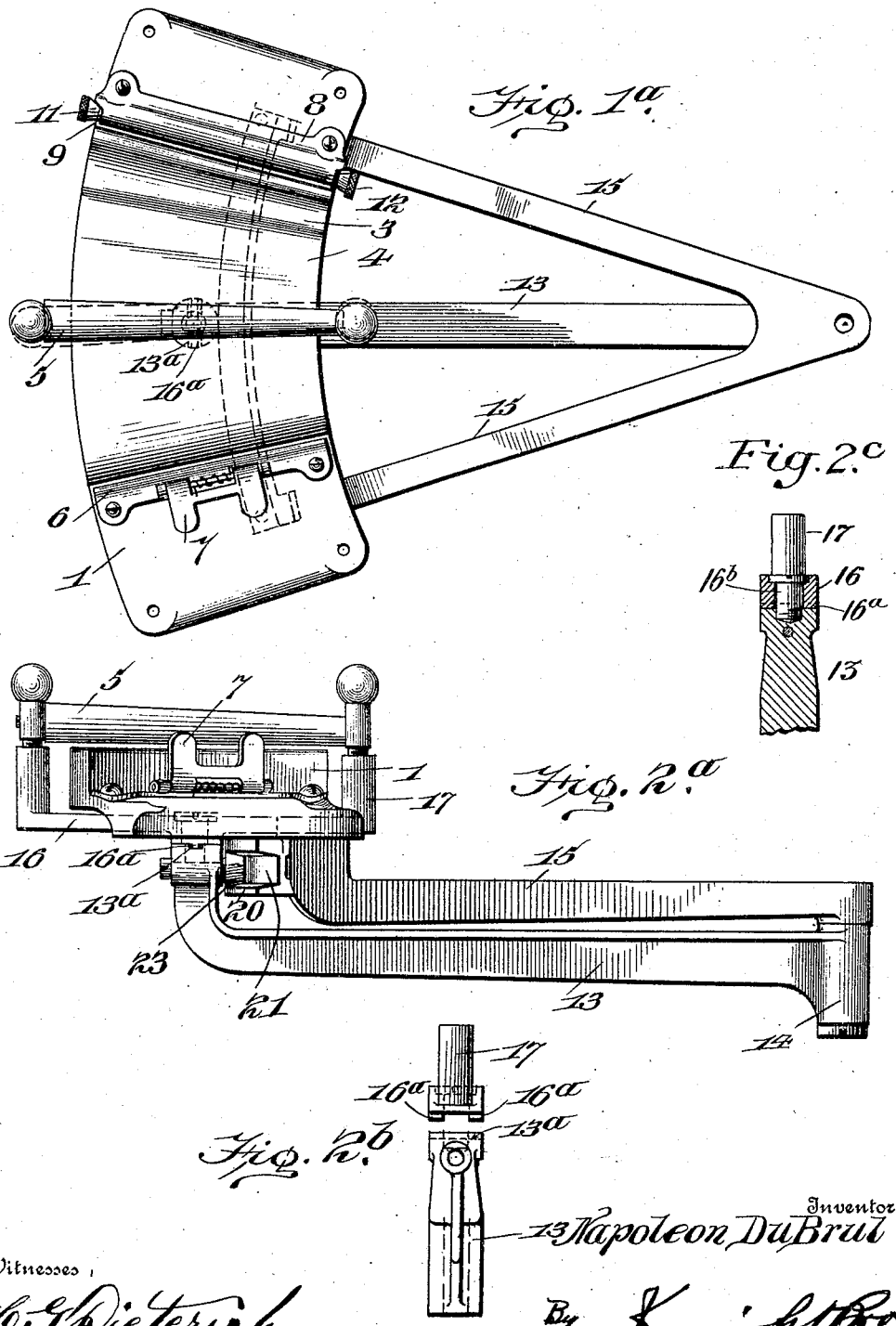

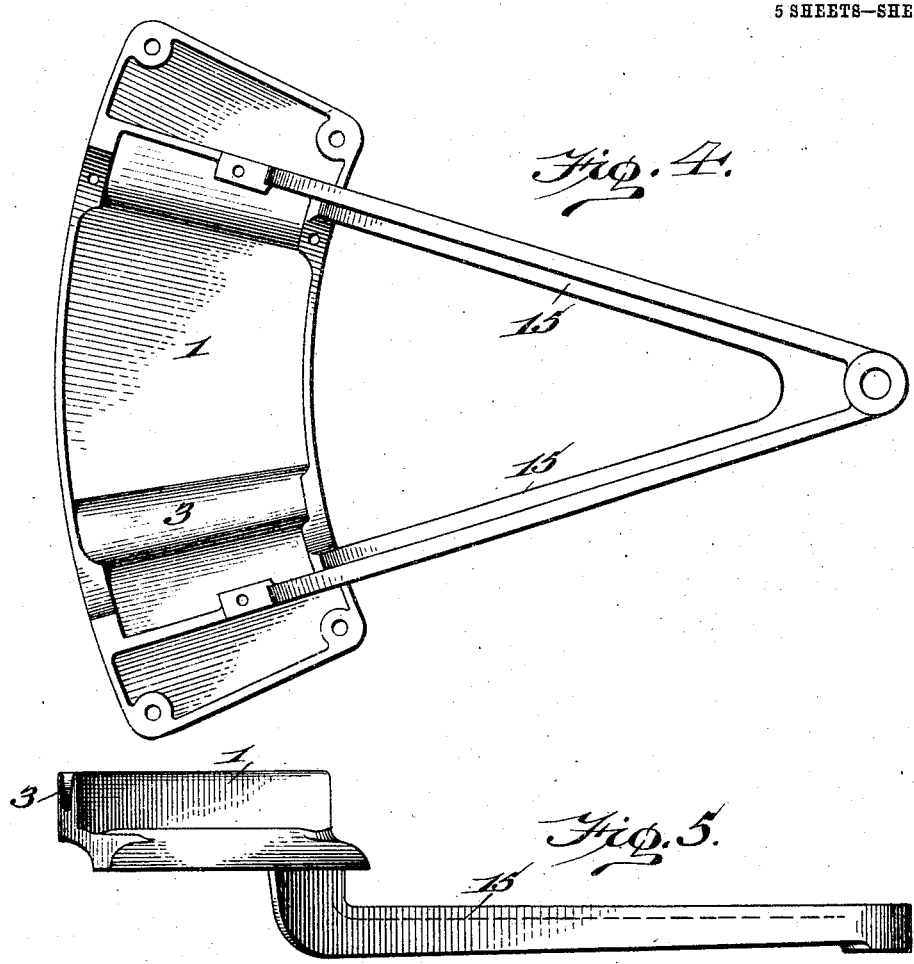
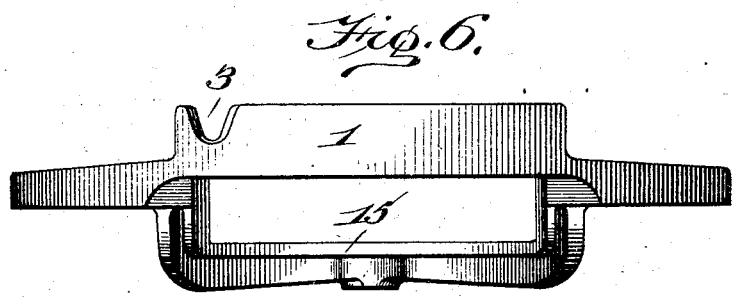

No. 787,735. PATENTED APR. 18, 1905.
N. DU BRUL.
RADIAL CIGAR BUNCH MACHINE.
APPLICATION FILED NOV. 11, 1903.
5 SHEETS—SHEET 5.
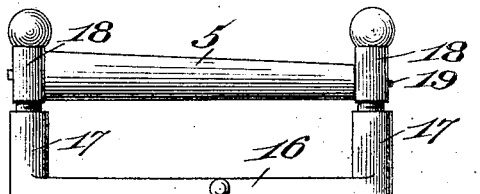
Fig. 7.
Fig. 8. Fig. 9.
 
Fig. 10. Fig. 11.
 
Fig. 12. Fig. 13.
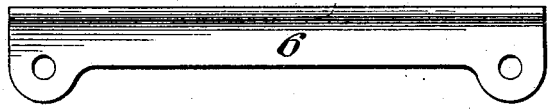 
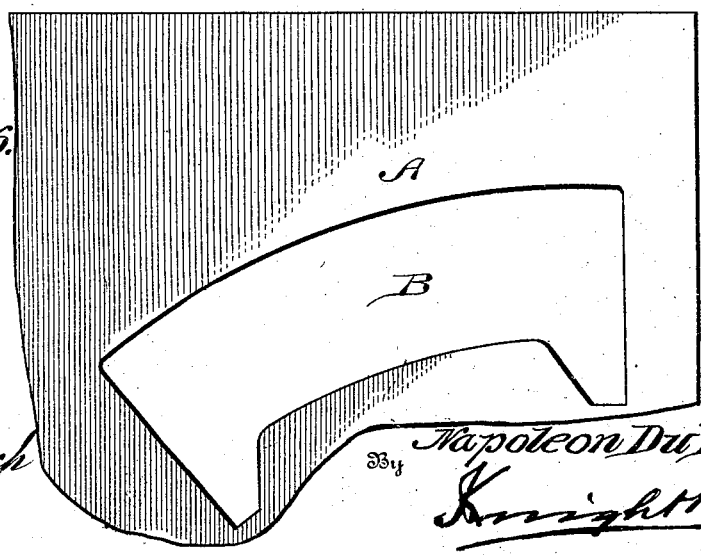
Fig. 16.
Witnesses
H. S. Dieterich
Harold Knight
Inventor
Napoleon Du Brul
By Knight Bros
Attorneys No. 787,735. Patented April 18, 1905.

UNITED STATES PATENT OFFICE.

NAPOLEON DU BRUL, OF CINCINNATI, OHIO.

RADIAL CIGAR-BUNCH MACHINE.

SPECIFICATION forming part of Letters Patent No. 787,735, dated April 18, 1905.

Application filed November 11, 1903. Serial No. 180,765.

*To all whom it may concern:*

Be it known that I, NAPOLEON DU BRUL, a citizen of the United States, and a resident of Cincinnati, in the county of Hamilton, State of Ohio, have invented certain new and useful Improvements in Radial Cigar-Bunch Machines, of which the following is a specification.

My invention relates to that type of cigar-bunch machines in which the bunch is shaped and the binder rolled around the bunch in an apron which is manipulated through means of a rolling-lever swinging in a horizontal plane, the rolling table and the apron being arcuate to correspond to the path of the swinging end of the lever.

The object of my invention is to greatly improve the structure of such a machine in its various features; and my invention therefore consists in certain novel details of construction hereinafter fully described, and particularly pointed out in the claims.

In the accompanying drawings, Figure 1 is a plan of my improved machine. Fig. $1^a$ is a plan of another embodiment of the machine, showing a swivel connection by which the roller is allowed to adjust itself to the shape of the bunch. Fig. 2 is a vertical longitudinal section of the machine shown in Fig. 1. Fig. $2^a$ is a side elevation of the machine shown in Fig. $1^a$. Fig. $2^b$ is a detail view of the swivel connection between the head and lever. Fig. $2^c$ is a vertical section through the vertical pivot of the roller. Fig. 3 is a vertical transverse section of the machine shown in Fig. 1. Figs. 4, 5, and 6 are respectively a bottom plan, a side view, and a front view, of the segmental frame. Fig. 7 is a side view of the radial rolling-lever. Figs. 8 and 9 show plan and end views of the arcuate track for the swinging end of the lever. Figs. 10 and 11 show plan and end views, on an enlarged scale, of the clamp for the adjustable end of the apron. Figs. 12 and 13 show plan and end views, on an enlarged scale, of the clamp employed for securing the fixed end of the apron and upon which the clip for catching the rolled bunch is mounted. Fig. 14 represents the bunch-catching clip. Fig. 15 represents the square securing-rod by which the adjustable end of the apron is adjustably secured in its clamp, and Fig. 16 represents the opening in the work table or bench required to receive the machine.

1 represents the rolling-table, which may be suitably secured to any suitable bench or support A, as by screws 2. This table is arcuate in form and constructed with the usual pocket 3.

4 represents the rolling-apron, and 5 the roller. The apron 4 is fixedly secured at one end by a clamp 6, which may be conveniently provided with the usual bunch-receiving clip 7. The opposite end of the apron is adjustably held in a clamp 8, having a socket 9, by means of a rod 10 passing through a loop of the apron, introduced laterally into the slot. The section of the rod 10 is square or angular to hold the apron against slipping and for moving the apron in the socket of the clamp to adjust the length of the apron when the rod is turned by rotating its head 11 and the apron drawn in the direction corresponding to the adjustment desired. As shown, the head 11 is conical, and a conical nut 12, threaded on the opposite end of the rod, may be turned up to force the coned portions into the ends of the socket to bind the rod, and through it the apron, in any position to which it may be adjusted. The roller is supported wholly from beneath the table by means of radial lever 13, fulcrumed at 14 at the geometrical center of the segmental frame 15, which forms an extension beneath the bench A from the rolling-table 1. The lever 13 supports the bunching-roller through the medium of a head 16, centrally mounted on the swinging end of the lever and formed with two sockets 17, extending on either side of the rolling-table in position to receive the threaded ends of the posts 18, in which the axle 19 of the roller is mounted. The head 16 preferably has a pivotal mounting upon lever 13 to allow the roller 5 to adjust itself in the act of rolling to the rolling-apron, which is thereby allowed to conform itself to the shape of the bunch. In such a case (shown in Figs. $1^a$, $2^a$, $2^b$, and $2^c$) the end of lever 13 is provided with a groove $13^a$, and head 16 has centrally located a corresponding tongue 16ª, which fits into said groove 13ª, but is narrower. The screw 16ᵇ, which holds head 16 in place upon lever 13, is not threaded upon its upper part, so that head 16 may turn upon it in either direction as its vertical axis to the extent permitted by the tongue and groove.

The axle 19 preferably passes through one of the posts 18 and is threaded into the other, so that it can be readily removed and when so removed will permit the posts to screw into or out of their sockets for the purpose of varying the distance of the bunching-roller to or from the table. The posts 18 serve as handles by which to manipulate the machine.

The construction of the segmental frame and of the rolling-lever and its head are such that the opening B, Figs. 2 and 16, in bench A or other support upon which the machine may be mounted is quite narrow and permits the surface of the bench to project well beneath the rolling-table to prevent scraps of tobacco from dropping through the opening.

A further important feature of my invention consists in the segmental track 20, constructed with groove 21 and suitably secured beneath the table, as by screws 22, in position to receive a roller 23, carried by the free end of lever 13. By this track and its coöperating roller the swinging end of the lever is rigidly held against vertical movement in either direction, whether under the upward influence of the bunch being rolled or the weight of the hand of the operator, so that the distance of the roller from the table, obtained by the adjustment of the posts 18, will be accurately maintained throughout the swinging movement of the lever and any tendency of the lever to sag when its fulcrum becomes worn will be prevented.

From the foregoing description it will be observed that the working parts of my machine, with the exception of the rolling-table and the parts immediately coöperating therewith, are all below the bench or other support and leave the surface of the latter free and unobstructed to receive the stock or material which is being worked up.

Having thus described my invention, the following is what I claim as new therein and desire to secure by Letters Patent:

1. In a radial cigar-bunch machine, the combination of the arcuate rolling-table, the rolling-apron, the conical wrapping-roller coöperating with said table and belt, means for supporting the roller consisting of a swinging lever having a fixed fulcrum and a head pivotally mounted on a vertical axis upon the lever, and on which the roller is supported.

2. In a radial cigar-bunch machine, the combination of the rolling-table, the roller coöperating with said table, and means for supporting the roller consisting of a swinging lever, a head pivotally mounted on a vertical axis upon the lever, and on which the roller is supported, and a tongue-and-groove connection between the head and the lever to limit the movement of the head.

3. In a radial cigar-bunch machine, the combination of the rolling-table, the roller coöperating with said table and the support for said roller consisting of the swinging lever located entirely within planes below the table, the head mounted upon the swinging end of the lever, projecting on opposite sides of the table, and supporting the roller; and the track, and its coöperating roller mounted, one on the fixed part of the machine and the other on the swing-lever to afford vertical support for the swinging end of the lever.

4. In a radial cigar-bunch machine, the combination of the rolling-table, the roller coöperating with the table, and the support for the roller comprising a swinging lever below the table, the head pivotally mounted upon the swinging end of the lever at right angles to the direction of travel of the lever, projecting on opposite sides of the table and supporting the roller.

5. In a radial cigar-bunch machine, the combination of the rolling-table, the roller coöperating with said table and the support for said roller consisting of the swinging lever below the table, the head centrally and pivotally mounted upon the swinging end of the lever, projecting on opposite sides of the table, and supporting the roller; and the track, and its coöperating roller mounted, one on the fixed part of the machine and the other on the swinging lever to afford vertical support for the swinging end of the lever.

6. In a radial cigar-bunch machine, the combination of the rolling-table, the segmental extension on said table, projecting therefrom and disposed entirely within planes lower than the table, the swinging arm pivoted in said segmental extension swinging beneath the table and having a head projecting on opposite sides of the table, and the bunching-roller supported on said head.

7. In a cigar-bunch machine, the combination of the rolling-table, the apron, the swinging lever mounted below the table, the head projecting on opposite sides of the table, the vertically-adjustable posts threaded in said head, a single bunching-roller, and an axle on which the roller is mounted, threaded into one of said posts and passing through the other.

8. In a cigar-bunch machine, the combination of the rolling-table, the swinging lever mounted below the table, the head centrally and pivotally mounted on the lever and projecting on opposite sides of the table, the vertically-adjustable posts threaded in said head, and the bunching-roller mounted on an axle secured in said posts.

9. In combination with the rolling-table and bunching-roller of a radial cigar-bunch machine, a centrally-pivoted head extending upward on either side of the table, adjustable supports for said roller mounted in said head and a support for the head.

10. In a cigar-bunch machine, the combination with the rolling-apron, of means for adjustably securing an end of the apron consisting of the socket, into which a loop of the apron may be introduced, a rotatable rod passing through the loop of the apron in said socket, and the nut on said rod for securing it in any position to which it is rotated.

11. A cigar-bunching machine, having a rolling table and apron, a roller coöperating with the apron, and the moving support for the roller; said roller being mounted upon its moving support by a pivot normal to the axis of the roller.

12. In a cigar-bunching machine, a roller, a support for the roller, and a pivot for the roller, normal to the axis of the roller and to the direction of travel of the roller.

13. In a cigar-bunch machine, the combination with the rolling-apron, of means for adjustably securing an end of the apron comprising a socket, into which an end of the apron is introduced, a rotatable rod of non-circular cross-section fitted in the socket and engaging the apron, and means for securing the rod in any position to which it may be rotated.

14. In a cigar-bunch machine, the combination with the rolling-apron, of means for adjustably securing an end of the apron comprising a socket, and a rotatable rod fitted in the socket and engaging the apron, and cone portions at the ends of the rods adjustable relatively to one another to hold the rod in any position to which it may be rotated.

15. In a cigar-bunch machine, the combination with the rolling-apron, of means for adjustably securing an end of the apron comprising a socket, and a rotatable rod of non-circular cross-section fitted in the socket and engaging the apron, a conical head at one end of the rod, and a conical nut threaded on the opposite end of the rod to bind the rod in the socket.

16. In a radial cigar-bunch machine, the combination of the rolling-table, the segmental extension on said table projecting therefrom, the swinging lever pivoted to the segmental extension, swinging beneath the table, a head on the segmental extension projecting on opposite sides of the table, a bunching-roller supported on said head, a track on a fixed part of the machine below the table, and a roller revolving on a horizontal axis, carried by the swinging lever and moving on the track.

The foregoing specification signed this 19th day of October, 1903.

NAPOLEON DU BRUL.

In presence of—
  F. BROERMAN,
  EDWIN H. FISHER.